(12) United States Patent
Lee

(10) Patent No.: US 11,260,478 B2
(45) Date of Patent: Mar. 1, 2022

(54) VALVE FOR PREVENTING DISTORTION

(71) Applicant: Sang Seon Lee, Wonju-si (KR)

(72) Inventor: Sang Seon Lee, Wonju-si (KR)

(*) Notice: Subject to any disclaimer, the term of this patent is extended or adjusted under 35 U.S.C. 154(b) by 0 days.

(21) Appl. No.: 16/744,925

(22) Filed: Jan. 16, 2020

(65) Prior Publication Data
US 2020/0238449 A1 Jul. 30, 2020

Related U.S. Application Data

(63) Continuation of application No. PCT/KR2019/007059, filed on Jun. 12, 2019.

(30) Foreign Application Priority Data

Jan. 25, 2019 (KR) .................. 10-2019-0010046
Jun. 11, 2019 (KR) .................. 10-2019-0068362

(51) Int. Cl.
F16K 27/02 (2006.01)
F16K 27/06 (2006.01)
B23P 15/00 (2006.01)

(52) U.S. Cl.
CPC ........ *B23P 15/001* (2013.01); *F16K 27/0209* (2013.01); *F16K 27/0236* (2013.01); *F16K 27/065* (2013.01); *F16K 27/067* (2013.01)

(58) Field of Classification Search
CPC .. F16K 27/0236; F16K 27/0272; F16K 27/12; F16K 27/126; F16K 27/00; F16K 27/02; F16K 27/04; F16K 27/06; F16K 27/062; F16K 27/065; F16K 27/067; F16K 7/12; F16K 7/126; B23P 15/001; B29C 51/12; B29C 70/02; B29C 45/14
See application file for complete search history.

(56) References Cited

U.S. PATENT DOCUMENTS 5,149,054 A * 9/1992 Passerell ............... F16K 5/045
251/309

FOREIGN PATENT DOCUMENTS

| CN | 105587915 A | * | 5/2016 |
|----|-------------|---|--------|
| CN | 105587915 A |   | 5/2016 |
| KR | 100463485 B1 |  | 12/2004 |
| KR | 20170035819 A |  | 3/2017 |
| KR | 20180010041 A |  | 1/2018 |

* cited by examiner

*Primary Examiner* — Hailey K. Do

(57) ABSTRACT

Various valves capable of preventing distortion are disclosed. The valve comprises a metal member configured to have at least two sub metal members and a main body. Here, the sub metal members are included in the main body, and the main body is formed of plastic.

10 Claims, 12 Drawing Sheets

VALVE FOR PREVENTING DISTORTION

CROSS-REFERENCE TO RELATED APPLICATIONS

This application is a continuation application of a PCT application filed on Jun. 12, 2019 and assigned Serial No. PCT/KR2019/007059, and which claims priority from Korean Patent Application No. 10-2019-0010046 filed with the Korean Intellectual Property Office on Jan. 25, 2019, Korean Patent Application No. 10-2019-0068362 filed with the Korean Intellectual Property Office on Jun. 11, 2019. The entire disclosure of above patent applications is incorporated herein by reference.

TECHNICAL FIELD

The present disclosure relates to various valves for preventing distortion.

BACKGROUND ART

Conventional valve is formed of a metal. As a result, it is difficult to process the valve and manufacturing cost of the valve is very expensive.

SUMMARY

To solve problem of the prior art, the disclosure is to provide various valves capable of preventing distortion.

A valve according to one embodiment of the disclosure includes a metal member configured to have at least two sub metal members; and a main body. Here, the sub metal members are included in the main body, and the main body is formed of plastic.

A valve according to another embodiment of the disclosure includes a metal member; and a main body formed of plastic. Here, at least one hole in which melt plastic is filled when an insert molding is performed is formed on the metal member, and the metal member is included in the main body through the insert molding.

A method of manufacturing a valve according to one embodiment of the disclosure includes surrounding an integral liner with sub metal members; and inserting a structure where the sub metal members surround the liner in melt plastic, so that the sub metal members are included in a main body formed of plastic.

In a valve of the disclosure, a metal member is included in a main body formed of plastic. Accordingly, distortion may not be occurred to the valve when the valve is combined with a pipe or another valve.

Additionally, the valve of the disclosure is very excellent compared to a valve formed of plastic, in view of strength.

BRIEF DESCRIPTION OF DRAWINGS

Example embodiments of the present disclosure will become more apparent by describing in detail example embodiments of the present disclosure with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

The embodiment relates to a valve, and a metal member is included in a main body formed of plastic. As a result, distortion of the valve may be prevented when the valve is combined with a pipe or another valve.

If the main body is formed of a metal, strength of the valve is excellent and distortion of the valve is prevented. However, it is difficult to process the valve to have desired shape and manufacture cost of the valve is very expensive.

If the main body is formed of only plastic, it is easy to process the valve and manufacture cost of the valve is low. However, distortion may occur to the valve when the valve is combined with a pipe or another valve, and so the valve may be broken down.

Accordingly, the embodiment provides various valves capable of preventing distortion with easy processing and low manufacture cost.

Hereinafter, various embodiments of the disclosure will be described in detail with reference to accompanying drawings.

Figure 1:
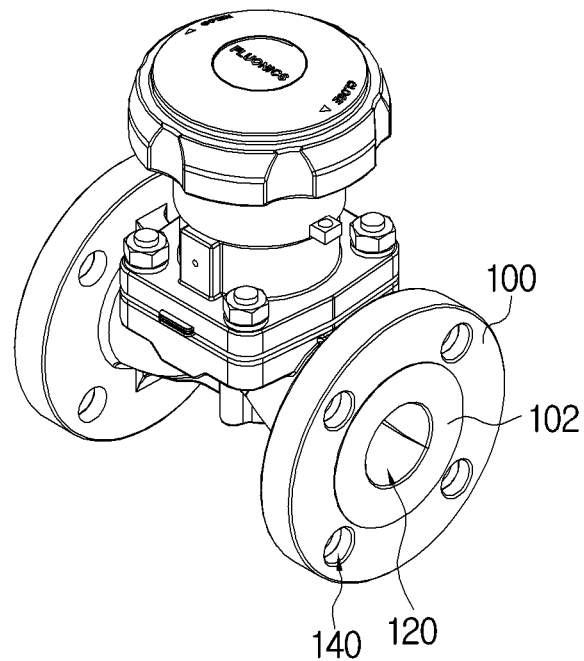
FIG. 1 is a perspective view illustrating a valve according to one embodiment of the disclosure.
Figure 2:
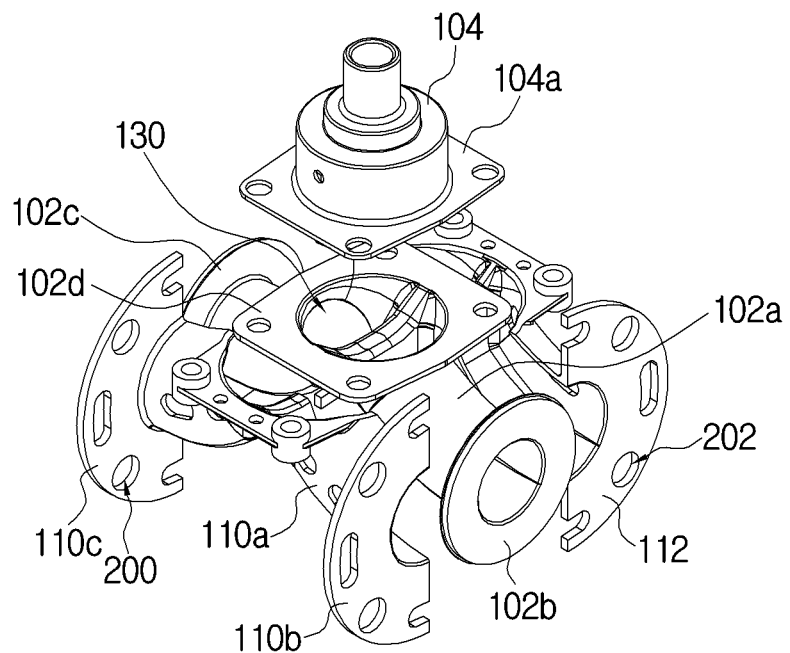
FIG. 2 is a perspective view illustrating a metal member according to one embodiment of the disclosure.
Figure 3:
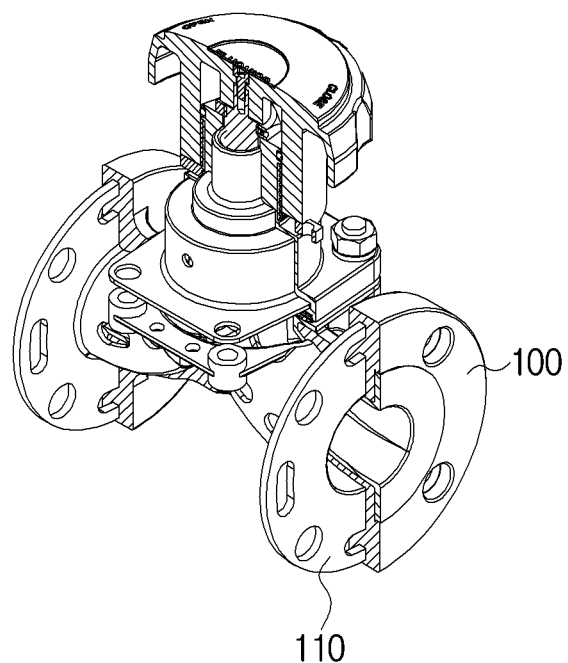
FIG. 3 is a view illustrating a structure in which the metal member is covered by plastic.
Figure 4:
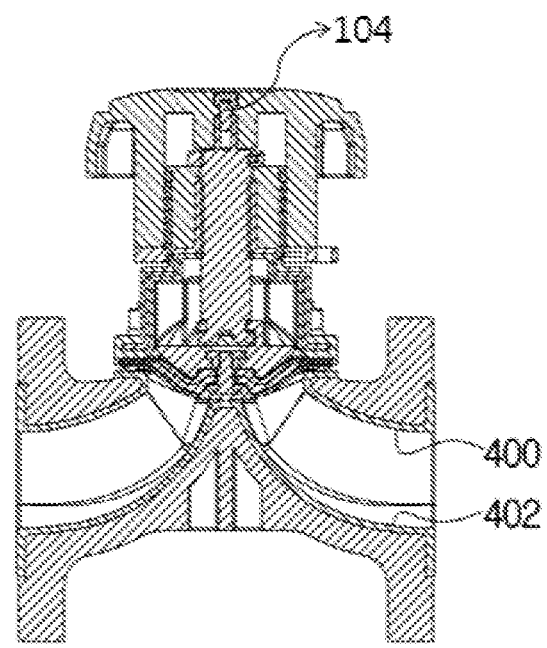
FIG. 4 is a sectional view illustrating a fluid flow space according to one embodiment of the disclosure.

FIG. 1 is a perspective view illustrating a valve according to one embodiment of the disclosure, FIG. 2 is a perspective view illustrating a metal member according to one embodiment of the disclosure, FIG. 3 is a view illustrating a structure in which the metal member is covered by plastic, and FIG. 4 is a sectional view illustrating a fluid flow space according to one embodiment of the disclosure.

In FIG. 1 to FIG. 3, the valve of the present embodiment is for example a diaphragm valve, and it may include a main body 100, a liner 102, a metal member having a first sub metal member 110 and a second sub metal member 112 and an opening-closing member 104.

The main body 100 may be formed of plastic.

In one embodiment, the main body 100 may be formed of an engineering plastic. For example, the main body 100 may be made up of a polyphenylene ethers resin composition including a polyphenylene ethers resin and a polystyrene resin. Of course, the main body 100 may be formed of a polypropylene, a polyimide, a polysulfone, a poly phenylene sulfide, a polyamide imide, a polyacrylate, a polyether sulfone, a polyether ether ketone, a polyether imide, a liquid crystal polyester, a polyether ketone, etc. and their combination.

Holes 140 may be formed to a side end part (flange) of the main body 100. A fixing member may connect the valve to a pipe or another valve through the holes 140, which is not shown.

The liner 102 is disposed in the main body 100.

In one embodiment, the liner 102 may be formed of a fluorine resin. The fluorine resin means every resin including fluorine in a molecule, and it includes a Polytetrafluoroethylene, PTFE, a Polychlorotrifluoroethylene PCTFE, a PolyVinyliDene Fluoride PVDF, a Fluorinated ethylene propylene FEP, an Ethyl Tetra Fluoro Ethylene ETFE or a Perfluoroalkoxy alkane PFA, etc. This fluorine resin has excellent heat resistance, excellent chemical resistance, excellent electric insulation, small friction coefficient, and does not have adhesion. That is, velocity change of flow due to a laminar flow in the fluid flow space 120 may be minimized because the friction coefficient of the liner 102 is small, when the liner 102 is formed of fluorine resin. Particularly, difference between flow velocity at an upper part or a lower part of the fluid flow space 120 and flow velocity at central part of the fluid flow space 120 may be minimized, based on a specific point.

The fluid flow space 120 through which fluid flows may be formed in the liner 102.

In one embodiment, the fluid flow space 120 may have a streamlined shape in a direction of a central part corresponding to the opening-closing member 104 after linearly longitudinal-extended from an inlet, and have a streamlined shape in the direction of the central part after linearly longitudinal-extended from an outlet.

In another embodiment, the fluid flow space 120 may have a streamlined shape from the inlet in a direction from the inlet to the central part corresponding to the opening-closing member 104 as shown in FIG. 4, and have a streamlined shape from the outlet in a direction from the outlet to the central part. In this case, an inner upper surface 400 or an inner lower surface 402 of the liner 102 may have a streamlined shape in a direction from the inlet to the central part and have a streamlined shape in a direction from the outlet to the central part. Specially, a curve may start and be extended from the inlet or the outlet.

The opening-closing member 104 opens/closes fluid flow in the fluid flow space 120, and it may locate on the main body 100 or the liner 102. For example, the opening-closing member 104 may be a diaphragm.

Hereinafter, elements of the valve will be described in detail.

The main body 100 may include a main body member and main body flange members formed at both ends of the main body member.

At least one hole 140 may be formed on a first main body flange member, a hole may be formed on a flange of a pipe, and the first main body flange member may be combined with a flange of a piping (for example, a pipe) by passing a fixing member such as a bolt, etc. through the hole 140 of the first main body flange member and the flange of the piping. As a result, the valve may be combined with the pipe. Accordingly, the valve of the disclosure may be referred to as a piping combination device.

A hole for combination with the pipe may be formed on a second main body flange member.

The liner 102 may include a liner body member 102a, a first liner flange member 102b, a second liner flange member 102c and a liner combination member 102d. Here, a space 130 opened/closed by the opening-closing member 104 may be formed at a central part of the liner combination member 102d, and the liner combination member 102d may be combined with an opening-closing combination member 104a.

The liner body member 102a may be disposed in the main body member.

The first liner flange member 102b may have a width higher than the liner body member 102a and be disposed in the first main body flange member. One side of the first liner flange member 102b may be exposed outside.

The second liner flange member 102c may have a width higher than the liner body member 102a and be disposed in the second main body flange member. One side of the second liner flange member 102c may be exposed outside.

The metal member may surround the liner 102 and be included in the main body 100. Here, whole of the metal member is included in the main body 100, and none part of the metal member may be exposed outside. That is, the liner 102 locates in the metal member, and the whole of the metal member may be included in the main body 100.

In one embodiment, the metal member may include a first sub metal member 110 and a second sub metal member 112. For example, the metal member may include two sub metal members 110 and 112 having the same structure. Here, the sub metal members 110 and 112 are separated and are not combined each other.

The first sub metal member 110 may be in integral type, cover a half of the liner 102 and include a first sub metal body member 110a, a 1-1 sub metal flange member 110b and a 1-2 sub metal flange member 110c.

The first sub metal body member 110a may cover a half of the liner body member 102a and have a curved shape.

The 1-1 sub metal flange member 110b may be connected to an end part of the first sub metal body member 110a and be disposed just beneath the first liner flange member 102b. Particularly, a groove curve line formed at a center of the 1-1 sub metal flange member 110b may cover a half of the liner body member 102a just beneath the first liner flange member 102b, curvature of the groove curve line being the same as or similar to that of the liner body member 102a.

In one embodiment, a width of the 1-1 sub metal flange member 110b is higher than that of the first liner flange member 102b. As a result, at least part of the 1-1 sub metal flange member 110b may be projected outside the first liner flange member 102b in a width direction while the 1-1 sub flange member 110b supports the first liner flange member 102b, when the 1-1 sub metal flange member 110b surrounds the liner body member 102a. Here, the first liner flange member 102b may be projected compared to the 1-1 sub metal flange member 110b in a longitudinal direction.

On the other hand, the 1-1 sub metal flange member 110b might surround directly the first liner flange member 102b. In this case, the valve may have unstable structure because a space exists between the liner 102 and the metal member. Accordingly, it is effective that the 1-1 sub metal flange member 110b surrounds the liner body member 102a just beneath the first liner flange member 102b while the 1-1 sub metal flange member 110b closes to the first liner flange member 102b.

At least one hole may be formed on the 1-1 sub metal flange member 110b, a fixing member passing through the hole. That is, the fixing member passes the hole of a first main body flange member and the hole of the 1-1 sub metal flange member 110b when the valve is combined with the pipe.

The 1-2 sub metal flange member 110c may be connected to the other end of the first sub metal body member 110a and be disposed just beneath of the second liner flange member 102c while it closes to the second liner flange member 102c. Particularly, a groove curve line formed at a center of the 1-2 sub metal flange member 110c may cover half of the liner body member 102a just beneath the second liner flange member 102c, wherein the groove curve line may have the same curvature as the liner body member 102a or similar curvature to the liner body member 102a.

In one embodiment, a width of the 1-2 sub metal flange member 110c is higher than that of the second liner flange member 102c. As a result, at least part of the 1-2 sub metal flange member 110c may be projected outside the second liner flange member 102c in a width direction while the 1-2 sub metal flange member 110c supports the second liner flange member 102c, when the 1-2 sub metal flange member 110c covers the liner body member 102a. Here, the second liner flange member 102c may be projected compared to the 1-2 sub metal flange member 110c in a longitudinal direction.

On the other hand, the 1-2 sub metal flange member 110c might surround directly the second liner flange member 102c. In this case, the valve may have unstable structure because a space exists between the liner 102 and the metal member. Accordingly, it is effective that the 1-2 sub metal flange member 110c surrounds closely the liner body member 102a just beneath the second liner flange member 102c.

At least one hole may be formed on the 1-2 sub metal flange member 110c, a fixing member passing through the hole. That is, the fixing member passes through the hole of a second main body flange member and the hole of the 1-2 sub metal flange member 110c when the valve is combined with the pipe.

The second sub metal member 112 may be in a body, surround the other half of the liner 102 and include a second sub metal body member, a 2-1 sub metal flange member and a 2-2 sub metal flange member.

The second sub metal body member may cover the other half of the liner body member 102a and have a curve shape.

The 2-1 sub metal flange member may be connected to an end part of the second sub metal body member and be closely disposed just beneath the first liner flange member 102b. Particularly, a groove curve line formed at a center of the 2-1 sub metal flange member may surround the other half of the liner body member 102a just beneath the first liner flange member 102b, wherein the groove curve line may have the same curvature as the liner body member 102a or similar curvature to the liner body member 102a.

In one embodiment, a width of the 2-1 sub metal flange member is higher than that of the first liner flange member 102b. As a result, at least part of the 2-1 sub metal flange member may be projected outside the first liner flange member 102b in a width direction while the 2-1 sub metal flange member supports the first liner flange member 102b, when the 2-1 sub metal flange member surrounds the liner body member 102a. Here, the first liner flange member 102b may be projected compared to the 2-1 sub metal flange member in a longitudinal direction.

On the other hand, the 2-1 sub metal flange member might cover directly the first liner flange member 102b. In this case, the valve may have unstable structure because a space exists between the liner 102 and the metal member. Accordingly, it is effective that the 2-1 sub metal flange member surrounds closely the liner body member 102a just beneath the first liner flange member 102b.

At least one hole may be formed on the 2-1 sub metal flange member, a fixing member passing through the hole. That is, the fixing member passes through the hole of a first main body flange member and the hole of the 2-1 sub metal flange member when the valve is combined with the pipe.

On the other hand, the 2-1 sub metal flange member may have a shape of doughnuts cut by half, end sections except the groove curve line may be contacted with end sections of the 1-1 sub metal flange member 110b. That is, the metal member may surround the liner 102 while the end sections of the 1-1 sub metal flange member 110b are contacted with the end sections of the 2-1 sub metal flange member. Here, the 1-1 sub metal flange member 110b has a shape of doughnuts cut by half.

The 2-2 sub metal flange member may be connected to the other end of the second sub metal body member and be closely disposed just beneath the second liner flange member 102c. Particularly, a groove curve line formed at a center of the 2-2 sub metal flange member may surround the other half of the liner body member 102a just beneath the second liner flange member 102c, wherein the groove curve line may have the same curvature as the liner body member 102a or similar curvature to the liner body member 102a.

In one embodiment, a width of the 2-2 sub metal flange member is higher than that of the second liner flange member 102c. As a result, at least part of the 2-2 sub metal flange member may be projected outside the second liner flange member 102c in a width direction while the 2-2 sub metal flange member supports the second liner flange member 102c, when the 2-2 sub metal flange member surrounds the liner body member 102a. Here, the second liner flange member 102c may be projected compared to the 2-2 sub metal flange member in a longitudinal direction.

On the other hand, the 2-2 sub metal flange member might cover directly the second liner flange member 102c. In this case, the valve may have unstable structure because a space exists between the liner 102 and the metal member. Accordingly, it is effective that the 2-2 sub metal flange member surrounds the liner body member 102a just beneath the second liner flange member 102c while it closes to the second liner flange member 102c.

At least one hole may be formed on the 2-2 sub metal flange member, a fixing member passing through the hole. That is, the fixing member passes through the hole of a second main body flange member and the hole of the 2-2 sub metal flange member when the valve is combined with the pipe.

On the other hand, the 2-2 sub metal flange member may have a shape of doughnuts cut by half, end sections except the groove curve line may be contacted with end sections of the 1-2 sub metal flange member 110c. That is, the metal member may surround the liner 102 while the end sections of the 1-2 sub flange member 110c are contacted with the end sections of the 2-2 sub metal flange member. Here, the 1-2 sub metal flange member 110c has a shape of doughnuts cut by half.

In a manufacturing process, the metal member may be formed in the main body 100 by using an insert molding. Particularly, the metal member may be included in the main body 100 and the liner 102 may be formed in the metal member by insert-molding a structure where the sub metal members 110 and 112 surround the liner 102 in plastic which is material of the main body 100.

At least one hole other than the hole for the fixing member may be formed on the flange members 110b, 110c, etc. of the metal member, so that the metal member is strongly fixed to the main body 100. In the insert molding process, melt plastic fills the hole, and thus the metal member may be strongly combined in the main body 100.

One or more projection members may be formed on the metal member to more strongly combine the metal member in the main body 100.

To use two separated sub metal members 110 and 112 is for locating the liner 102 in the metal member. It is impossible to insert the liner 102 in the metal member because a width of the flange member 102b or 102c of the liner 102 is greater than an inner space of the metal member, if the metal member is in a body. Accordingly, two separated sub metal members 110 and 112 are used to locate the liner 102 including the flange member 102b or 102c higher than the inner space of the metal member in the metal member.

Shortly, the sub metal members 110 and 112 may be included in the main body 100 formed of the plastic through the insert molding, while two sub metal members 110 and 112 surround the liner 102. Here, the liner 102 may locate in the metal member.

Distortion may occur to a valve due to a fixing force of a fixing member in a direction opposed to a fixed direction when a flange of the valve is combined with a flange of a pipe through the fixing member, if the main body surrounds directly a liner and a metal member does not surround the liner.

Distortion may not occur or be minimized to the valve because a flange in the valve is strengthened though the flange of the valve is combined with a flange of a pipe through the fixing member, when the metal member is included in the main body 100 formed of the plastic while the liner 102 is disposed in the metal member.

Of course, distortion may be prevented when the valve is combined with the pipe, if the main body is formed of metal and the liner is included in the main body. However, it is difficult to process the main body and manufacturing cost of the valve may increase sharply. Additionally, corrosion may occur to the valve and lifetime of the valve may get shorter.

Accordingly, the main body 100 in the valve of the embodiment is formed of the plastic, wherein the metal member is formed in the main body 100 to reinforce strength. In this case, it is sufficient not to process precisely the metal member and it is easy to process precisely the plastic. Hence, it is easy to process the valve to have desired shape, manufacturing cost of the valve may be reduced and the distortion may be minimized when the valve is combined with the pipe or another valve.

On the other hand, the flange member of the liner 102, the flange member of the metal member and the flange member of the main body 100 form a flange. In view of the flange, a metal member is included in a plastic. As a result, distortion may be minimized though the flange of the valve is combined with the flange of the pipe or a flange of another valve.

In the above description, the metal member comprises two sub metal members 110 and 112 disposed symmetrically with the same shape. However, the metal member may be formed with three or more sub metal members. Here, the liner 102 may be disposed in the sub metal members and the sub metal members may be included in the main body 100. The sub metal members may have the same shape or at least one of the sub metal members may have different shape.

For example, three sub metal members, which are separately disposed by 120° with the same shape, may surround the liner 102.

For example, it is efficient that the metal member includes two sub metal members 110 and 112, considering easiness of process.

Figure 5:
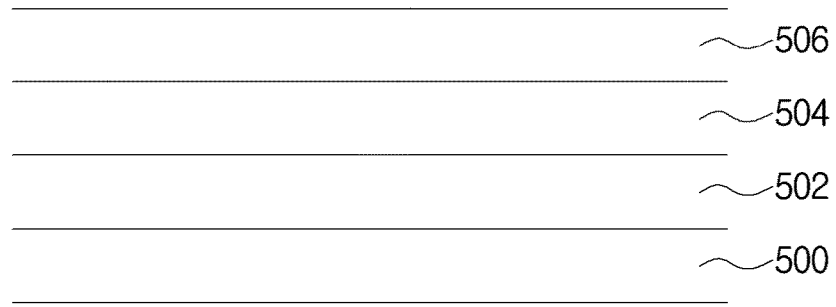
FIG. 5 is a view illustrating schematically section of a valve according to still another embodiment of the disclosure.

FIG. 5 is a view illustrating schematically section of a valve according to still another embodiment of the disclosure.

In FIG. 5, a liner 500, a resin layer 502, a metal member 504 including at least two sub metal members and a main body 506 may be sequentially disposed.

That is, unlike other embodiments, in the present embodiment, the resin layer 502 may be disposed between the liner 500 and the metal member 504.

In one embodiment, the resin layer 502 may be formed of the same material as the main body 506. The material of the main body in the above embodiment may be used as the material of the main body 506.

If molding after inserting a structure where the sub metal members surround the liner 500 in a plastic corresponding to the material of the main body 506, melted plastic permeates through a space between the liner 500 and the metal member 504 because a space exists between the sub metal members. As a result, the resin layer 502 may be formed between the liner 500 and the metal member 504.

A hole may be formed on a part of the metal member 504 so that the melted plastic is easily permeated between the liner 500 and the metal member 504.

The structure where the resin layer is formed between the liner and the metal member may be also applied to other embodiments.

Figure 6:
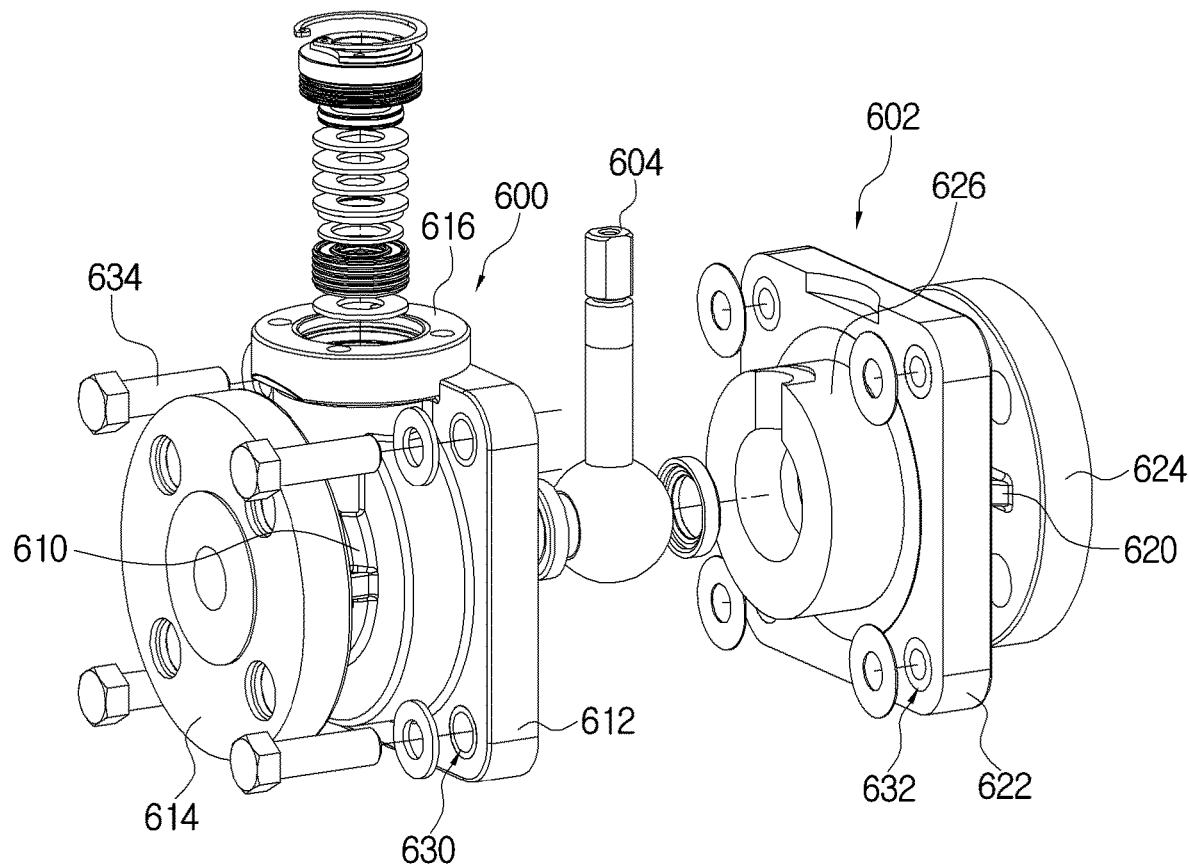
FIG. 6 is an exploded view illustrating a valve according to another embodiment of the disclosure.
Figure 7:
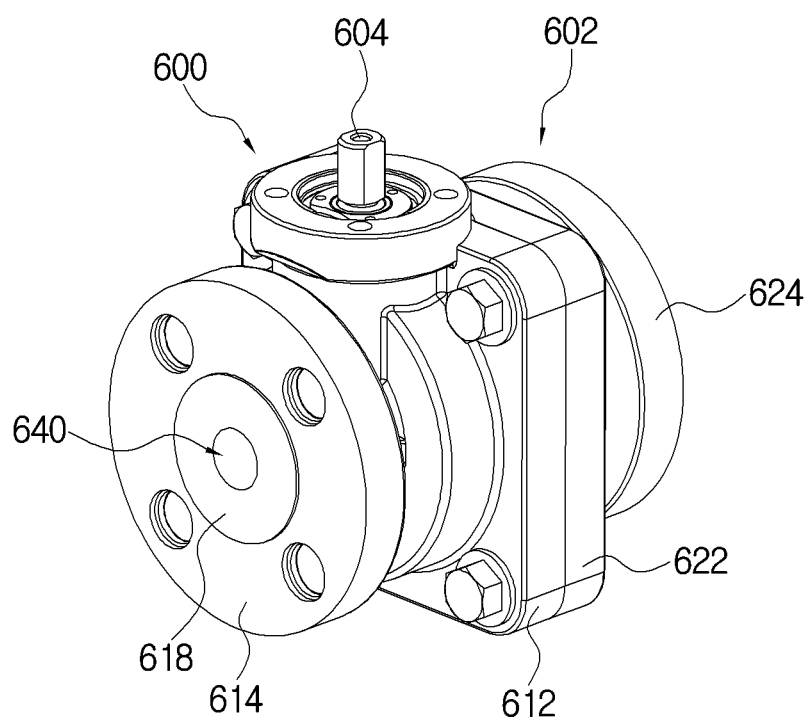
FIG. 7 is a perspective view illustrating the valve according to another embodiment of the disclosure.
Figure 8:
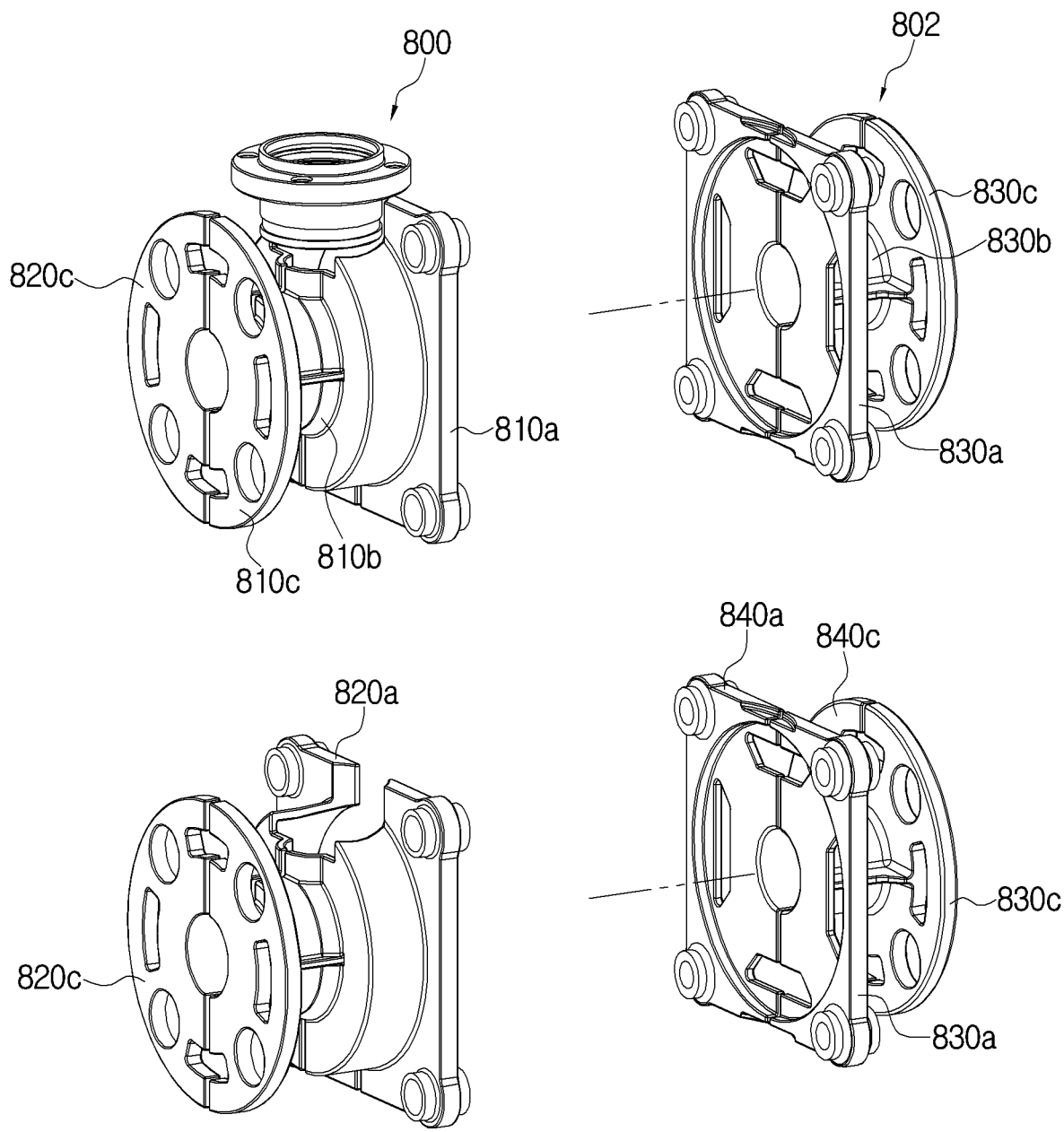
FIG. 8 is a perspective view illustrating a metal member according to one embodiment of the disclosure.
Figure 9:
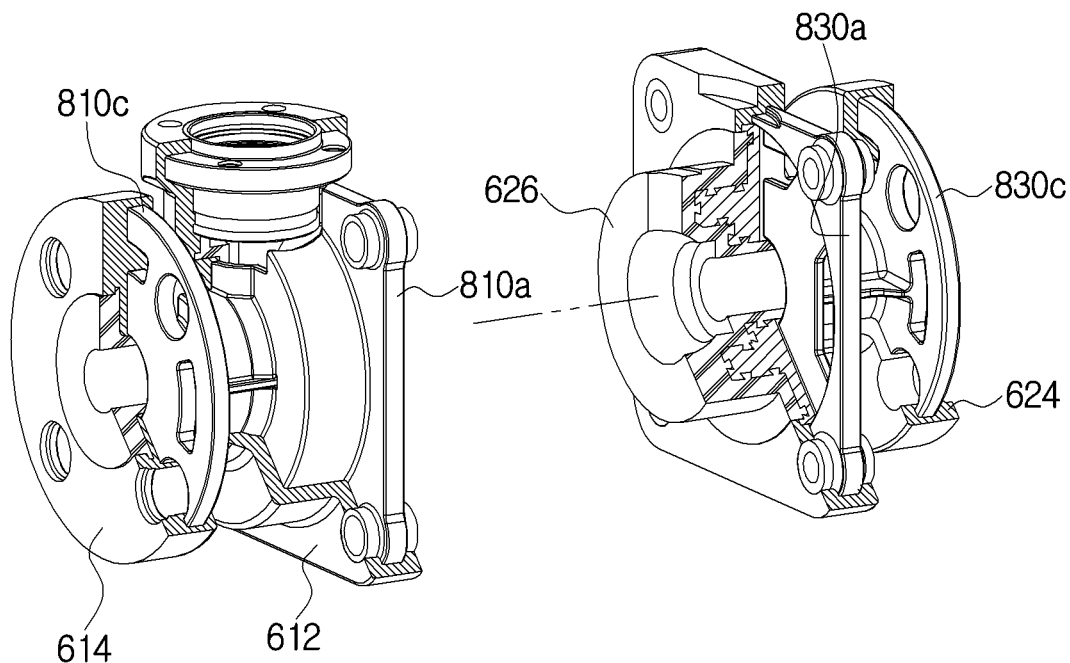
FIG. 9 is a perspective view illustrating a combination process of the metal member according to one embodiment of the disclosure.

FIG. 6 is an exploded view illustrating a valve according to an embodiment of the disclosure, and FIG. 7 is a perspective view illustrating the valve according to an embodiment of the disclosure. FIG. 8 is a perspective view illustrating a metal member according to an embodiment of the disclosure, and FIG. 9 is a perspective view illustrating a combination process of the metal member according to an embodiment of the disclosure.

In FIG. 6 to FIG. 9, the valve of the present embodiment may be a ball valve and include a first sub valve 600, a second sub valve 602 and an opening-closing member 604 having a ball shape.

The first sub valve 600 includes a first sub main body, a first sub metal member 800 and a first sub liner 618. A first sub fluid flow space 640 is formed in the first sub liner 618.

The first sub main body may include a first sub main body member 610, a first sub main body combination member 612, a first sub main body flange member 614 and an opening-closing inserting member 616 in which the opening-closing member 604 is inserted.

The first sub main body combination member 612 may be connected to one side of the first sub main body member 610 and be combined with a second sub main body combination member 622 of the second sub valve 602.

For example, at least one hole may be formed on the sub main body combination members 612 and 622 as shown in FIG. 6, respectively. The sub main body combination members 612 and 622 may be combined by passing a bolt 634 through the holes.

The first sub main body flange member 614 may be connected to another side of the first sub main body member 610 and be combined with a pipe or another valve through a bolt, etc.

The opening-closing inserting member 616 may be connected to another side, e.g. an upper side of the first sub main body member 610, the opening-closing member 604 being inserted into the opening-closing inserting member 616. A ball connected to an end part of the opening-closing member 604 may open/close a fluid flow space while the ball is inserted into the opening-closing inserting member 616. For example, fluid flows through the fluid flow space and a fluid path when the fluid path is formed to the ball and the fluid path locates in the same direction as the fluid flow space, and fluid flow may be closed when the fluid path is changed in a direction vertical to the fluid flow space according as the ball rotates.

The first sub liner 618 may be formed in the first sub main body member 610 and be formed of for example fluorine resin.

The first sub metal member 800 may include a 1-1 sub metal member and a 1-2 sub metal member.

The 1-1 sub metal member may surround half of the first sub liner 618 and include a 1-1 sub metal body member 810b, a 1-1 sub metal combination member 810a and a 1-1 sub metal flange member 810c.

The 1-2 sub metal member may surround the other half of the first sub liner 618 and include a 1-2 sub metal body member, a 1-2 sub metal combination member 820a and a 1-2 sub metal flange member 820c.

The 1-1 sub metal member and the 1-2 sub metal member surround the first sub liner 618, and whole of the 1-1 sub metal member and the 1-2 sub metal member is included in the first sub main body.

Structure and array of the sub metal flange members 810c and 820c are the same as in the above embodiment, and thus any description concerning theses will be omitted.

The second sub valve 602 includes a second sub main body, a second sub metal member and a second sub liner 626. A second sub fluid flow space is formed in the second sub liner 626.

The second sub main body may include a second sub main body member 620, a second sub main body combination member 622 and a second sub main body flange member 624.

The second sub main body combination member 622 may be connected to one side of the second sub main body member 620 and be combined with the first sub main body combination member 612 of the first sub valve 600.

The second sub main body flange member 624 may be connected to another side of the second sub main body member 620 and be combined with a pipe or another valve through a bolt, etc.

The second sub liner 626 may be formed in the second sub main body member 620 and be formed of for example fluorine resin.

The second sub metal member 802 may include a 2-1 sub metal member and a 2-2 sub metal member.

The 2-1 sub metal member may surround half of the second sub liner 626 and include a 2-1 sub metal body member 830b, a 2-1 sub metal combination member 830a and a 2-1 sub metal flange member 830c.

The 2-2 sub metal member may surround the other half of the second sub liner 626 and include a 2-2 sub metal body member, a 2-2 sub metal combination member 840a and a 2-2 sub metal flange member 840c.

The 2-1 sub metal member and a 2-2 sub metal member surround the second sub liner 626 and whole of the 2-1 sub metal member and a 2-2 sub metal member is included in the second sub main body.

Structure and array of the sub metal flange members 830c and 840c are the same as in the above embodiment, and thus any description concerning these will be omitted.

The first sub liner 618 and the second sub liner 626 form one liner, which is not described above. The 1-1 sub metal combination member 810a and the 1-2 sub metal combination member 820a form a first sub metal combination member, and the 2-1 sub metal combination member 830a and the 2-2 sub metal combination member 840a form a second sub metal combination member.

The first sub metal combination member, the second sub metal combination member, the first sub main body combination member 612 and the second sub main body combination member 622 form a valve combination member. The 1-1 sub metal flange member 810c, the 1-2 sub metal flange member 820c and the first sub main body flange member 614 may form a first flange member, and the 2-1 sub metal flange member 830c, the 2-2 sub metal flange member 840c and the second sub main body flange member 624 may form a second flange member.

Briefly, the sub metal members 800 and 802 in the valve of the present embodiment surround the liner and are included in the main body. That is, the valve is different from the valve in the first embodiment of FIG. 1 to FIG. 4 in that the valve includes two sub valves. However, structure and array of the sub liner, the sub metal member and the sub main body in each of the sub valves are similar in the first embodiment.

The structure in FIG. 5 may be applied to the sub valves.

Figure 10:
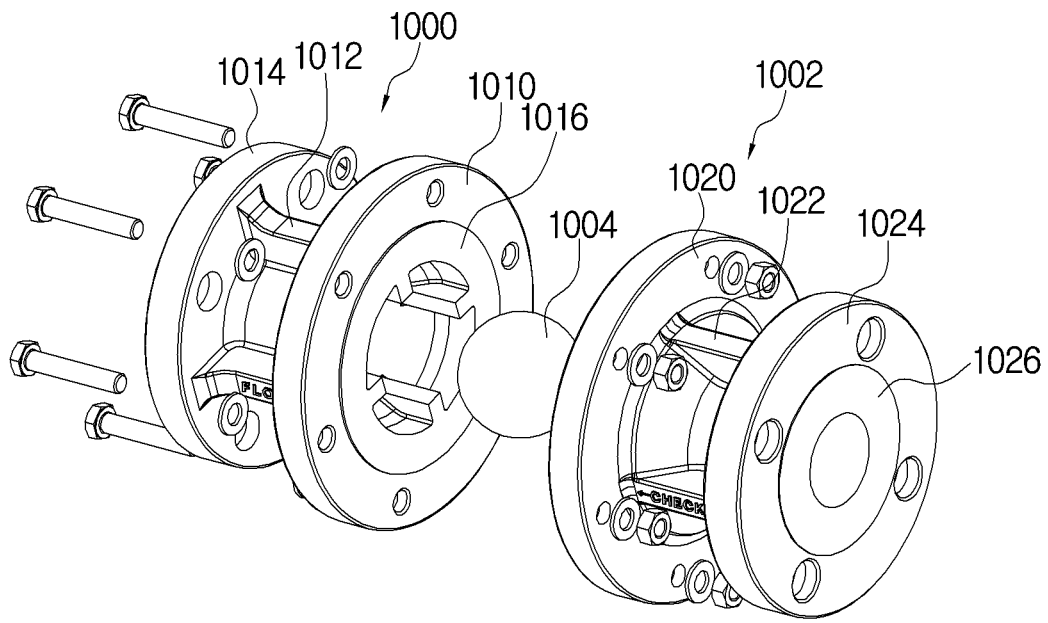
FIG. 10 is an exploded view illustrating a valve according to still another embodiment of the disclosure.
Figure 11:
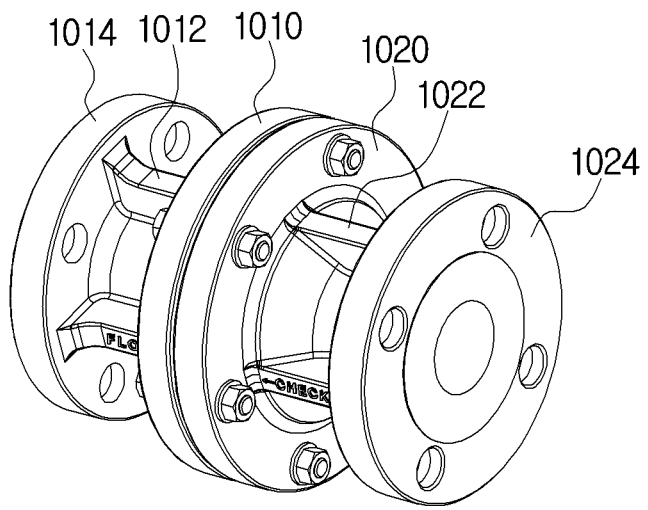
FIG. 11 is a perspective view illustrating a valve according to still another embodiment of the disclosure.
Figure 12:
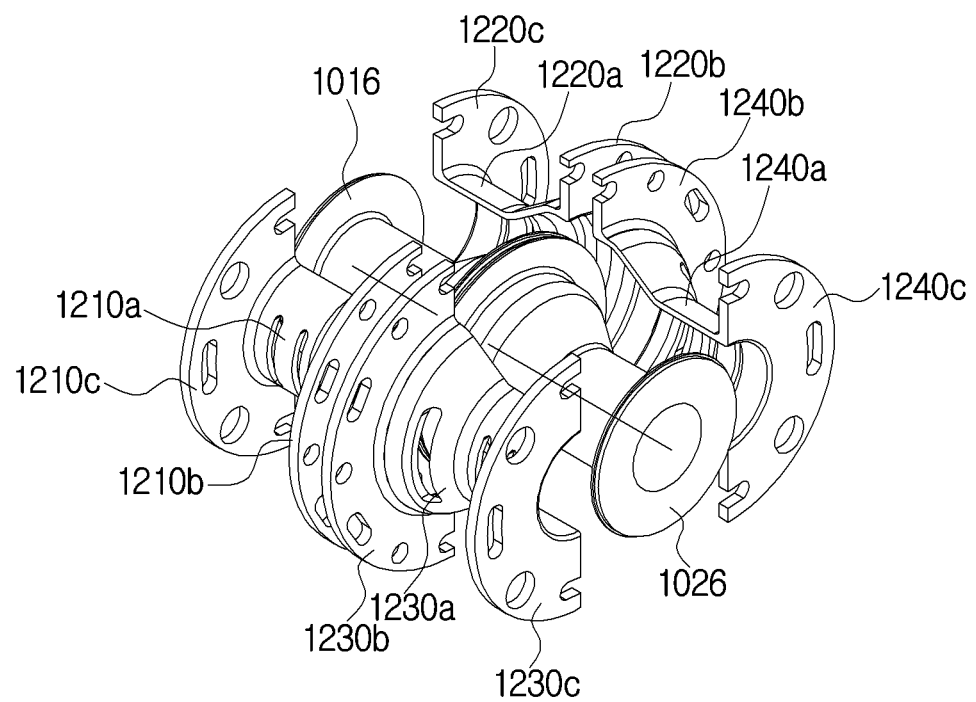
FIG. 12 is a perspective view illustrating a metal member according to one embodiment of the disclosure.
Figure 13:
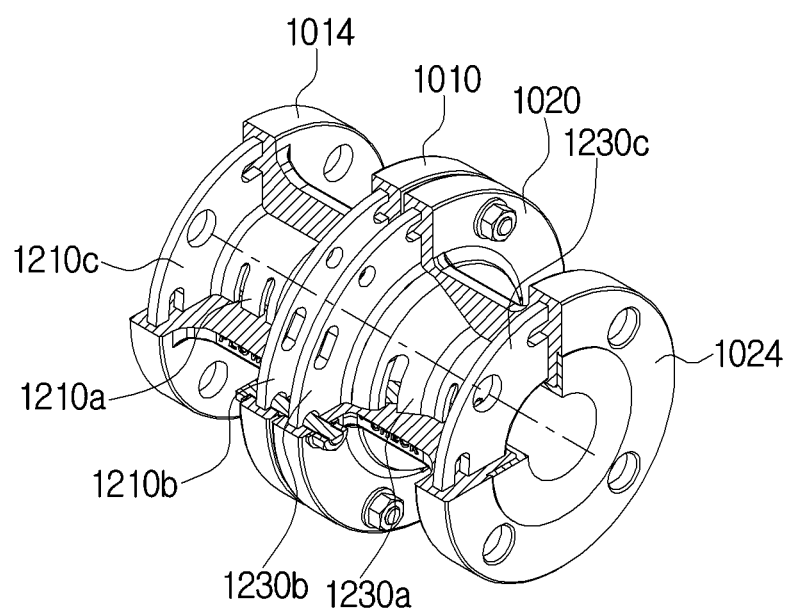
FIG. 13 is a perspective view illustrating a combination process of the metal member according to one embodiment of the disclosure.

FIG. 10 is an exploded view illustrating a valve according to still another embodiment of the disclosure, and FIG. 11 is a perspective view illustrating a valve according to still another embodiment of the disclosure. FIG. 12 is a perspective view illustrating a metal member according to one embodiment of the disclosure, and FIG. 13 is a perspective view illustrating a combination process of the metal member according to one embodiment of the disclosure.

In FIG. 10 to FIG. 13, the valve of the present embodiment may be a ball type check valve and include a first sub valve 1000, a second sub valve 1002 and a ball type opening-closing member 1004.

The first sub valve 1000 includes a first sub main body, a first sub metal member and a first sub liner 1016.

The first sub main body may include a first sub main body member 1012, a first sub main body combination member 1010 and a first sub main body flange member 1014. A first sub fluid flow space is formed in the first sub liner 1016.

The first sub main body combination member 1010 may be connected to one side of the first sub main body member 1012 and be combined with a second sub main body combination member 1020 of the second sub valve 1002.

For example, at least one hole may be formed to each of the sub main body combination members 1010 and 1020 as shown in FIG. 10 and the sub main body combination members 1010 and 1020 may be combined by passing a bolt through the holes.

The first sub main body flange member 1014 may be connected to the other side of the first sub main body member 1012 and be combined with a pipe or another valve via a bolt, etc.

The first sub liner 1016 is formed in the first sub main body member 1012 and is formed of for example fluorine resin.

The first sub metal member may include a 1-1 sub metal member and a 1-2 sub metal member.

The 1-1 sub metal member may surround half of the first sub liner 1016 and include a 1-1 sub metal body member 1210a, a 1-1 sub metal combination member 1210b and a 1-1 sub metal flange member 1210c.

The 1-2 sub metal member may surround the other half of the first sub liner 1016 and include a 1-2 sub metal body member 1220a, a 1-2 sub metal combination member 1220b and a 1-2 sub metal flange member 1220c.

The 1-1 sub metal member and the 1-2 sub metal member surround the first sub liner 1016 and whole of the 1-1 sub metal member and the 1-2 sub metal member is included in the first sub main body.

Structure and array of the sub metal flange members 1210c and 1220c are the same as in above embodiment, and thus any further description concerning these will be omitted.

The second sub valve 1002 includes a second sub main body, a second sub metal member and a second sub liner 1026.

The second sub main body may include a second sub main body member 1022, a second sub main body combination member 1020 and a second sub main body flange member 1024. A second sub fluid flow space is formed in the second sub liner 1026.

The second sub main body combination member 1020 may be connected to one side of the second sub main body member 1022 and be combined with the first sub main body combination member 1010 of the first sub valve 1000.

The second sub main body flange member 1024 may be connected to the other side of the second sub main body member 1022 and be combined with a pipe or another valve through a bolt, etc.

The second sub liner 1026 is formed in the second sub main body member 1022 and is formed of for example fluorine resin.

The second sub metal member may include a 2-1 sub metal member and a 2-2 sub metal member.

The 2-1 sub metal member may surround half of the second sub liner 1026 and include a 2-1 sub metal body member 1230a, a 2-1 sub metal combination member 1230b and a 2-1 sub metal flange member 1230c.

The 2-2 sub metal member may surround the other half of the second sub liner 1026 and include a 2-2 sub metal body member 1240a, a 2-2 sub metal combination member 1240b and a 2-2 sub metal flange member 1240c.

The 2-1 sub metal member and the 2-2 sub metal member surround the second sub liner 1026 and whole of the 2-1 sub metal member and the 2-2 sub metal member is included in the second sub main body.

Structure and array of the sub metal flange members 1230c and 1240c are the same as in above embodiment, and thus any further description concerning these will be omitted.

The first sub liner 1016 and the second sub liner 1026 form one liner, which is not described above. The 1-1 sub metal combination member 1210b and the 1-2 sub metal combination member 1220b may form a first sub metal combination member, and the 2-1 sub metal combination member 1230b and the 2-2 sub metal combination member 1240b may form a second sub metal combination member.

The first sub metal combination member, the second sub metal combination member, the first sub main body combination member 1010 and the second sub main body combination member 1020 may form a valve combination member, the 1-1 sub metal flange member 1210c, the 1-2 sub metal flange member 1220c and the first sub main body flange member 1014 may form a first flange member, and the 2-1 sub metal flange member 1230c, the 2-2 sub metal flange member 1240c and the second sub main body flange member 1024 may form a second flange member.

Shortly, the sub metal members in the valve of the present embodiment surround the liner and are included in the main body. That is, the valve is different from the valve of the first embodiment of FIG. 1 to FIG. 4 in that the valve includes two sub valves. However, structure and array of the sub liner, the sub metal member and the sub main body in each of the sub valves are similar in the first embodiment.

The structure in FIG. 5 may be applied to the sub valves.

Figure 14:
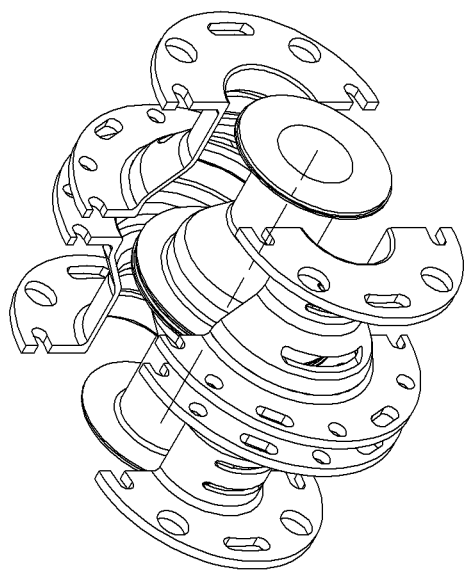
FIG. 14 is a perspective view illustrating a valve according to still another embodiment of the disclosure.
Figure 14:
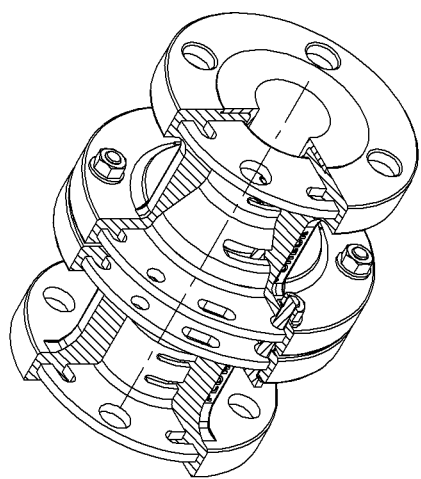
Figure 14:
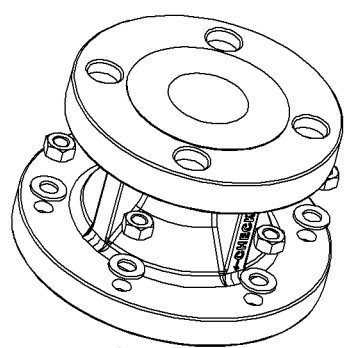
Figure 14:
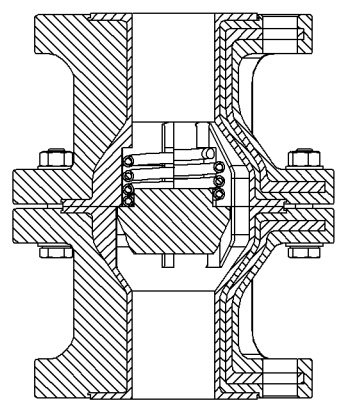
Figure 14:
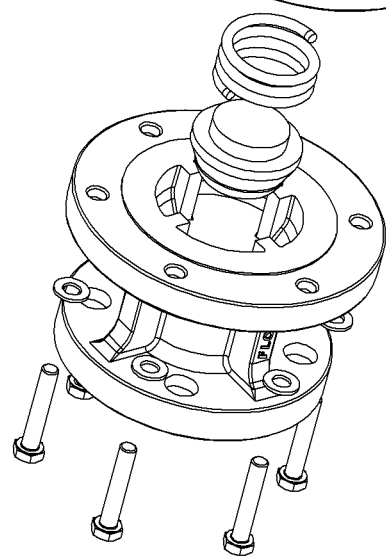
Figure 14:
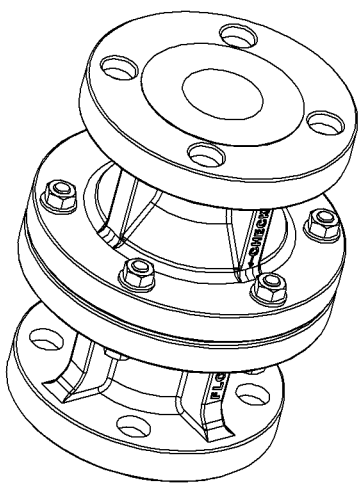

FIG. 14 is a perspective view illustrating a valve according to still another embodiment of the disclosure.

The valve in FIG. 14 is a spring type check valve and is identical to the ball type check valve in FIG. 10 to FIG. 13 except that an opening-closing member is formed with a spring. Accordingly, any further description concerning the valve will be omitted.

On the other hand, two sub valves are shown in FIG. 6 to FIG. 14. However, the valve may include three or more sub valves.

For example, in the event that the valve includes a first sub valve, a second sub valve and a third sub valve, a main body may include a first sub main body, a second sub main body and a third main body, and a metal member may include a first sub metal member included in the first sub main body, a second sub metal member included in the second sub main body and a third metal member included in the third sub main body.

Here, a sub main body combination member of the first sub main body and a sub metal combination member of the first sub metal member form a first sub valve combination member, a 2-1 sub main body combination member of the second sub main body and a 2-1 sub metal combination member of the second sub metal member form a 2-1 sub valve combination member, a 2-2 sub main body combination member of the second sub main body and a 2-2 sub metal combination member of the second sub metal member form a 2-2 sub valve combination member, and a sub main body combination member of the third sub main body and a sub metal combination member of the third sub metal member form the third sub valve combination member. The 2-1 sub valve combination member may be combined with the first sub valve combination member, and the 2-2 sub valve combination member may be combined with the third sub valve combination member.

That is, sub valve combination members not flange may be formed to both ends of the second sub valve located at middle position. A flange member of the first sub valve and a flange member of the third sub valve are similar to the flange members in above embodiment, and thus any further description concerning the flange members will be omitted.

Figure 15:
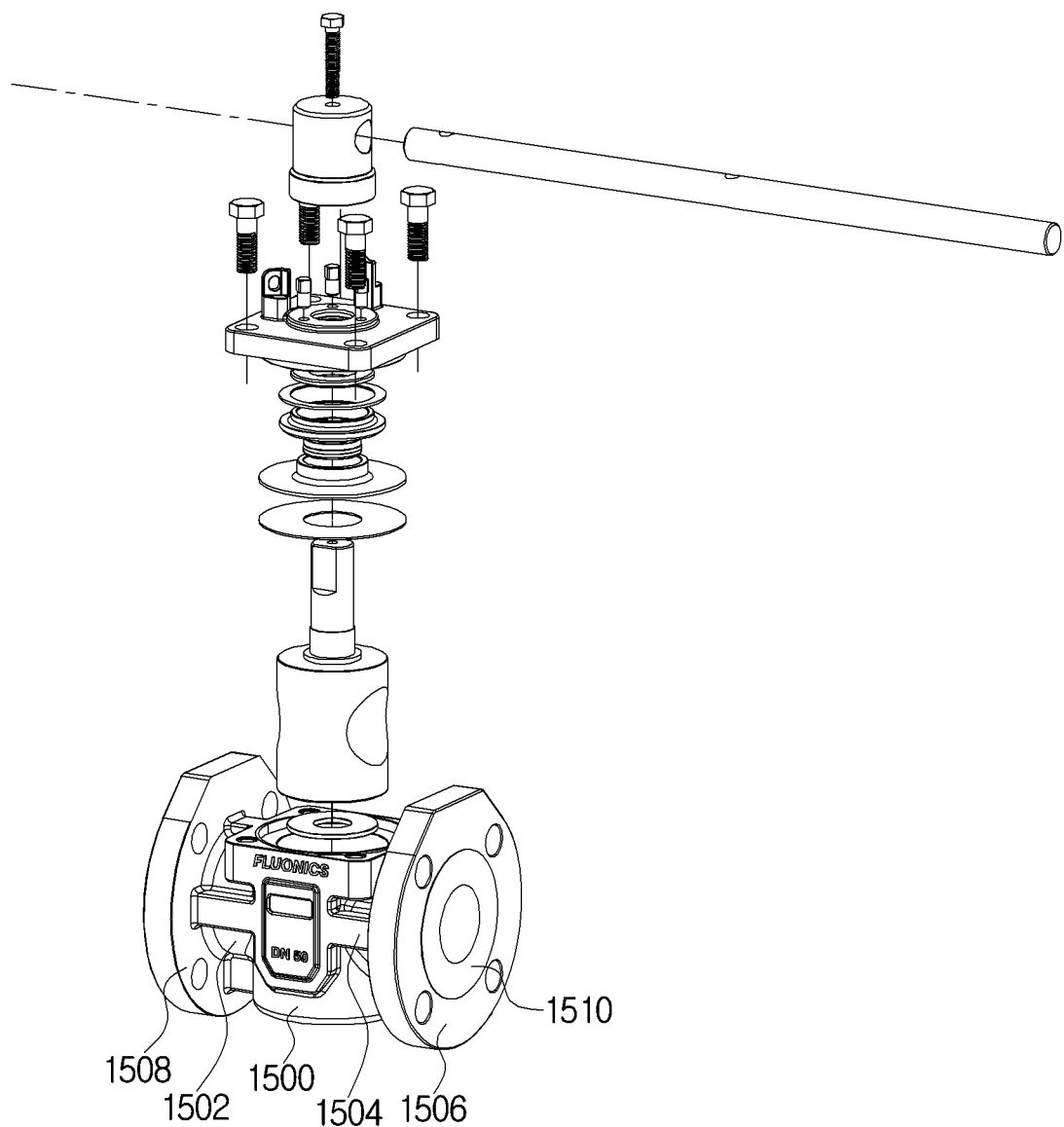
FIG. 15 is an expanded view illustrating a valve according to still another embodiment of the disclosure.
Figure 16:
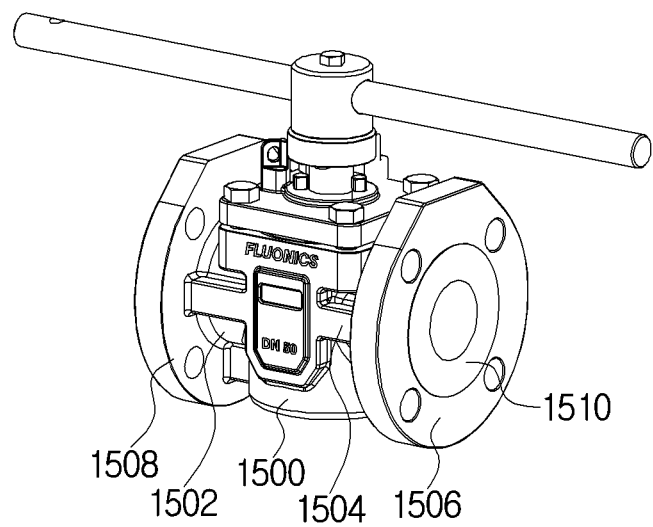
FIG. 16 is a perspective view illustrating a valve according to still another embodiment of the disclosure.
Figure 17:
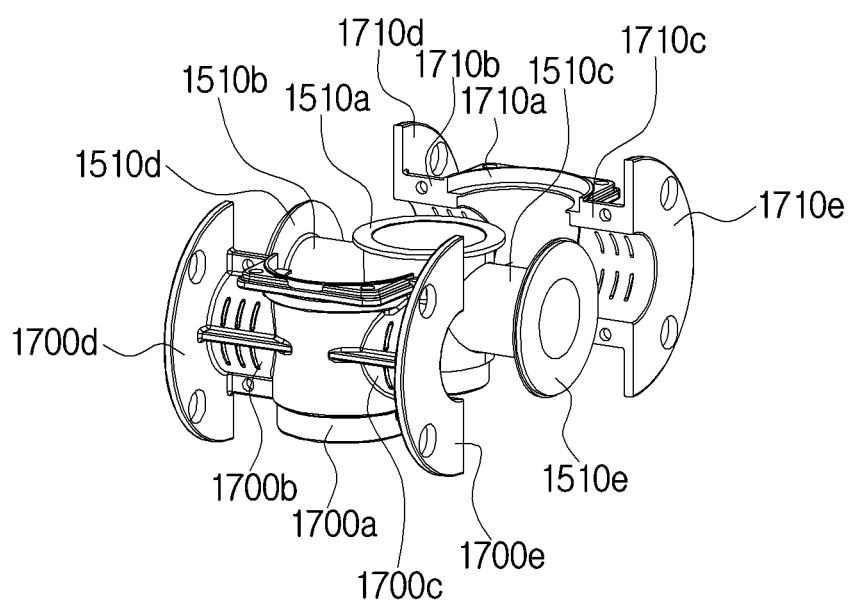
FIG. 17 is a perspective view illustrating a metal member according to one embodiment of the disclosure.
Figure 18:
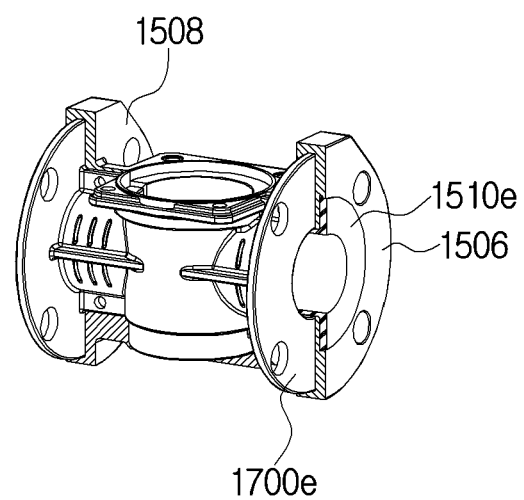
FIG. 18 is a perspective view illustrating a combination process of a metal member according to one embodiment of the disclosure.

FIG. 15 is an expanded view illustrating a valve according to still another embodiment of the disclosure, and FIG. 16 is a perspective view illustrating a valve according to still another embodiment of the disclosure. FIG. 17 is a perspective view illustrating a metal member according to one embodiment of the disclosure, and FIG. 18 is a perspective view illustrating a combination process of a metal member according to one embodiment of the disclosure.

In FIG. 15 to FIG. 18, the valve of the present embodiment may be a plug valve and include a main body, a first flange member 1508, a second flange member 1506, a metal member, a liner 1510 and an opening-closing member. The opening-closing member is not limited as long as it can open/close a fluid flow space, and any further description concerning the opening-closing member will be omitted.

The main body may include a main body central member 1500, a first main body connection member 1502 and a second main body connection member 1504.

A space into which the opening-closing member can be inserted may be formed to the main body central member 1500.

The first main body connection member 1502 may connect the main body central member 1500 to the first flange member 1508, and the second main body connection member 1504 may connect the main body central member 1500 to the second flange member 1506.

The metal member surrounds the liner 1510 and whole of the metal member may be included in the main body.

In one embodiment, the metal member includes a first sub metal member and a second sub metal member.

The first sub metal member may surround half of the liner 1510 and include a first sub metal central member 1700a surrounding half of the liner central member 1510a, a 1-1 sub metal connection member 1700b surrounding half of the first liner connection member 1510b, a 1-2 sub metal connection member 1700c surrounding half of the second liner connection member 1510c, a 1-1 sub metal flange member 1700d located just beneath the first liner flange member 1510d and a 1-2 sub metal flange member 1700e located just beneath the second liner flange member 1510e.

The second sub metal member may surround the other half of the liner 1510 and include a second sub metal central member 1710a surrounding the other half of the liner central member 1510a, a 2-1 sub metal connection member 1710b surrounding the other half of the first liner connection member 1510b, a 2-2 sub metal connection member 1710c surrounding the other half of the second liner connection member 1510c, a 2-1 sub metal flange member 1710d located just beneath the first liner flange member 1510d and a 2-2 sub metal flange member 1710e located just beneath the second liner flange member 1510e.

Structure and array of the sub metal flange members 1710d and 1710e are the same as in above embodiments, and thus any further description concerning these will be omitted.

The first main body flange member 1508, the 1-1 sub metal flange member 1700d, the 2-1 sub metal flange member 1710d and the first liner flange member 1510d may form a first flange member, and the second main body flange member 1506, the 1-2 sub metal flange member 1700e, the 2-2 sub metal flange member 1710e and the second liner flange member 1510e may form a second flange member.

The structure in FIG. 5 may be applied to the sub valves.

The first sub metal combination member may surround half of corresponding liner body member just beneath corresponding liner combination member while it closes to the liner combination member, and the second sub metal combination member may surround the other half of corresponding liner body member just beneath the liner combination member which it closes to the liner combination member, which is not described in above description. That is, array of the sub metal combination member and the liner combination member may be similar to that of the sub metal flange member and the liner flange member.

Hereinafter, material of the main body will be described in detail.

The main body may be formed by mixing a glass fiber with a Polyvinyl Chloride PVC, a polypropylene PP, a Poly Phenylene sulfide PPS, a Polyphthalamide PPA, a Polyamide PA6, a Polyamide PA66, a Polyketone POK or a Polyethylene PE. As a result, strength, impact resistance and mechanical feature of the main body may be enhanced.

In another embodiment, the main body may be formed by mixing a glass fiber and a carbon fiber with for example, a PVC, a PP, a PPS, a PPA, a PA6, a PA66, a POK or a PE. Accordingly, strength, impact resistance and mechanical feature of the main body may be enhanced.

In still another embodiment, the main body may be formed by mixing a glass fiber, a carbon fiber and a graphite fiber with for example, a PVC, a PP, a PPS, a PPA, a PA6, a PA66, a POK or a PE. Here, composition of the glass fiber, the carbon fiber and graphite fiber may be 20:10:5. As a result, strength, impact resistance and mechanical feature of the main body may be enhanced.

Hereinafter, composition and an experimental result will be described.

In one embodiment, the main body may be formed by mixing a PP with a glass fiber. Preferably, the glass fiber has a weight percent higher than 0 weight percent and less than 40 weight percent, and the PP has a weight percent higher than 60 weight percent. Experimental result is shown in following table 1.

TABLE 1

| embodiment | glass fiber weight percent | Tensile strength(Mpa@23° C.) [ASTM D638] |
|---|---|---|
| comparison | 0 | 25 |
| 1 | 10 | 54 |
| 2 | 15 | 59 |
| 3 | 20 | 78 |
| 4 | 30 | 83 |
| 5 | 40 | 94 |

It is verified through the above table 1 that tensile strength of the main body when the main body is formed by mixing the PP with the glass fiber is very greater than that of a main body formed of only the PP. That is, mechanical property and chemical property may be enhanced. However, it is difficult to manufacture the main body to have desired shape because an insert molding feature for manufacturing the main body is deteriorated when the glass fiber has a weight percent higher than 40 weight percent.

In another embodiment, the main body may be formed by mixing a PPS with a glass fiber. Preferably, the glass fiber has a weight percent higher than 0 weight percent and less than 40 weight percent, and the PPS has a weight percent higher than 60 weight percent. Experimental result is shown in following table 2.

TABLE 2

| embodiment | glass fiber weight percent | Tensile strength(Mpa@23° C.) [ASTM D638] |
|---|---|---|
| comparison | 0 | 70 |
| 1 | 30 | 140 |
| 2 | 40 | 200 |

It is verified through the above table 2 that tensile strength of the main body when the main body is formed by mixing the PPS with the glass fiber is very greater than that of a main body formed of only the PPS. That is, mechanical property and chemical property may be enhanced, and thus light and strong main body may be formed. However, it is difficult to manufacture the main body to have desired shape because an insert molding feature for manufacturing the main body is deteriorated when the glass fiber has a weight percent higher than 40 weight percent.

In still another embodiment, the main body may be formed by mixing a PPA with a glass fiber. Preferably, the glass fiber has a weight percent higher than 0 weight percent and less than 55 weight percent, and the PPA has a weight percent higher than 45 weight percent. Experimental result is shown in following table 3.

TABLE 3

| embodiment | glass fiber weight percent | Tensile strength(Mpa@23° C.) [ASTM D638] |
|---|---|---|
| comparison | 0 | 105 |
| 1 | 25 | 170 |
| 2 | 35 | 210 |
| 3 | 45 | 250 |
| 4 | 55 | 270 |

It is verified through the above table 3 that tensile strength of the main body when the main body is formed by mixing the PPA with the glass fiber is very greater than that of a main body formed of only the PPA. That is, mechanical property and chemical property may be enhanced, and thus light and strong main body may be formed. However, it is difficult to manufacture the main body to have desired shape because an insert molding feature for manufacturing the main body is deteriorated when the glass fiber has a weight percent higher than 55 weight percent.

In still another embodiment, the main body may be formed by mixing a PA6 with a glass fiber. Preferably, the glass fiber has a weight percent higher than 0 weight percent and less than 50 weight percent, and the PA6 has a weight percent higher than 50 weight percent. Experimental result is shown in following table 4.

TABLE 4

| embodiment | glass fiber weight percent | Tensile strength(Mpa@23° C.) [ASTM D638] |
|---|---|---|
| comparison | 0 | 70 |
| 1 | 15 | 125 |
| 2 | 20 | 145 |
| 3 | 30 | 170 |
| 4 | 33 | 180 |
| 5 | 35 | 185 |
| 6 | 40 | 192 |
| 7 | 45 | 200 |
| 8 | 50 | 220 |

It is verified through the above table 4 that tensile strength of the main body when the main body is formed by mixing the PA6 with the glass fiber is very greater than that of a main body formed of only the PA6. That is, mechanical property and chemical property may be enhanced, and thus light and strong main body may be formed. However, it is difficult to manufacture the main body to have desired shape because an insert molding feature for manufacturing the main body is deteriorated when the glass fiber has a weight percent higher than 50 weight percent.

In still another embodiment, the main body may be formed by mixing a PA66 with a glass fiber. Preferably, the glass fiber has a weight percent higher than 0 weight percent and less than 50 weight percent, and the PA66 has a weight percent higher than 50 weight percent. Experimental result is shown in following table 5.

TABLE 5

| embodiment | glass fiber weight percent | Tensile strength(Mpa@23° C.) [ASTM D638] |
|---|---|---|
| comparison | 0 | 80 |
| 1 | 25 | 165 |
| 2 | 30 | 186 |
| 3 | 33 | 196 |
| 4 | 35 | 200 |
| 5 | 50 | 245 |

It is verified through the above table 5 that tensile strength of the main body when the main body is formed by mixing the PA66 with the glass fiber is very greater than that of a main body formed of only the PA66. That is, mechanical property and chemical property may be enhanced, and thus light and strong main body may be formed. However, it is difficult to manufacture the main body to have desired shape because an insert molding feature for manufacturing the main body is deteriorated when the glass fiber has a weight percent higher than 50 weight percent.

In still another embodiment, the main body may be formed by mixing a POK with a glass fiber. Preferably, the glass fiber has a weight percent higher than 0 weight percent and less than 40 weight percent, and the POK has a weight percent higher than 60 weight percent. Experimental result is shown in following table 6.

TABLE 6

| embodiment | glass fiber weight percent | Tensile strength(Mpa@23° C.) [ASTM D638] |
|---|---|---|
| comparison | 0 | 60 |
| 1 | 15 | 100 |
| 2 | 20 | 125 |
| 3 | 30 | 140 |
| 4 | 40 | 165 |

It is verified through the above table 6 that tensile strength of the main body when the main body is formed by mixing the POK with the glass fiber is very greater than that of a main body formed with only the POK. That is, mechanical property and chemical property may be enhanced, and thus light and strong main body may be formed. However, it is difficult to manufacture the main body to have desired shape because an insert molding feature for manufacturing the main body is deteriorated when the glass fiber has a weight percent higher than 40 weight percent.

Components in the embodiments described above can be easily understood from the perspective of processes. That is, each component can also be understood as an individual process. Likewise, processes in the embodiments described above can be easily understood from the perspective of components.

The embodiments of the disclosure described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. A valve comprising:
   a metal member configured to have at least two sub metal members;
   a main body; and
   a liner,
   wherein the at least two sub metal members are included in the main body, and the main body is formed of plastic,
   wherein the at least two sub metal members surround the liner, the liner includes a liner body member and a liner flange member formed at an end part of the liner body member, at least one of the at least two sub metal members includes a sub metal body member and a sub metal flange member formed at an end part of the sub metal body member, and the main body includes a main body member and a main body flange member formed at an end part of the main body member,
   wherein a width of the sub metal flange member is larger than a width of the liner flange member, and the sub metal flange member surrounds the liner body member while the sub metal flange member is disposed behind the liner flange member.

2. The valve of claim 1, wherein the main body includes a first sub main body and a second sub main body, and the metal member includes a first sub metal member and a second sub metal member,
   and wherein the first sub metal member includes a 1-1 sub metal body member surrounding half of a first liner body member, a 1-2 sub metal body member surrounding the other half of the first liner body member, a 1-1 sub metal combination member connected to one side of the 1-1 sub metal body member, a 1-2 sub metal combination member connected to one side of the 1-2 sub metal body member, a 1-1 sub metal flange member connected to the other side of the 1-1 sub metal body member and a 1-2 sub metal flange member connected to the other side of the 1-2 sub metal body member, and
   the second sub metal member includes a 2-1 sub metal body member surrounding half of a second liner body member, a 2-2 sub metal body member surrounding the other half of the second liner body member, a 2-1 sub metal combination member connected to one side of the 2-1 sub metal body member, a 2-2 sub metal combination member connected to one side of the 2-2 sub metal body member, a 2-1 sub metal flange member connected to the other side of the 2-1 sub metal body member and a 2-2 sub metal flange member connected to the other side of the 2-2 sub metal body member.

3. The valve of claim 1, wherein the main body includes a first sub main body, a second sub main body and a third sub main body, and the metal member includes a first sub metal member included in the first sub main body, a second sub metal member included in the second sub main body and a third sub metal member included in the third sub main body,
   and wherein a sub main body combination member of the first sub main body and a sub metal combination member of the first sub metal member form a first sub valve combination member, a 2-1 sub main body combination member of the second sub main body and a 2-1 sub metal combination member of the second sub metal member form a 2-1 sub valve combination member, a 2-2 sub main body combination member of the second sub main body and a 2-2 sub metal combination member of the second sub metal member form a 2-2 sub valve combination member, a sub main body combination member of the third sub main body and a sub metal combination member of the third sub metal member form a third sub valve combination member,
   the 2-1 sub valve combination member is combined with the first sub valve combination member, and the 2-2 sub valve combination member is combined with the third sub valve combination member.

4. The valve of claim 1, wherein the sub metal body member and the sub metal flange member surround an outer surface of the liner body member,
   wherein the main body flange member surrounds an outer surface of the sub metal flange member, and
   wherein a size of the sub metal flange member is larger than a size of the liner flange member.

5. The valve of claim 1,
   wherein a fluid flow space through which fluid flows is formed in the liner, the liner is formed of fluorine resin.

6. The valve of claim 5, wherein the liner flange member, the sub metal flange member and the main body flange member form one flange.

7. The valve of claim 5, wherein at least one first hole, into which a fixing member is inserted to combine the valve with a pipe, and at least one second hole, in which melt plastic is filled when an insert molding is performed, are formed on the sub metal flange member.

8. The valve of claim 5, wherein each of the liner, the sub at least two metal members and the main body is in a body, the sub metal members surround whole of the liner body member, the sub metal flange member has a semi-circle, and a groove curve line of the sub metal flange member covers a half of the liner body member.

9. The valve of claim 5, wherein the fluid flow space has a streamlined shape from an inlet in a direction from the inlet to the opening-closing member or from an outlet in a direction from the outlet to the opening-closing member.

10. The valve of claim 5, wherein a resin layer is formed between the liner and the metal member,
    and wherein material of the resin layer is identical to material of the main body.

* * * * *